United States Patent Office 2,941,269
Patented June 21, 1960

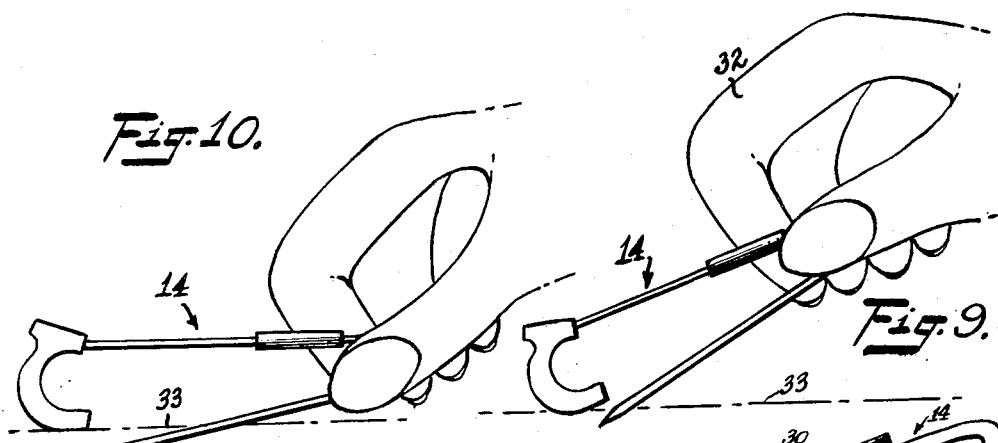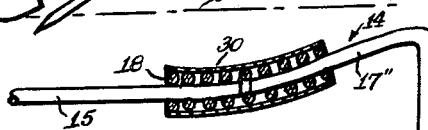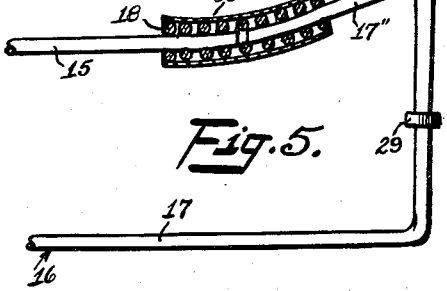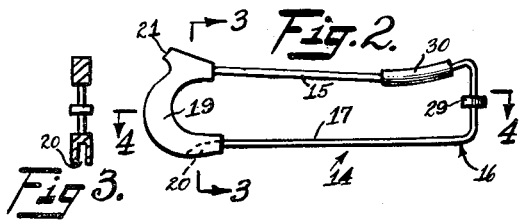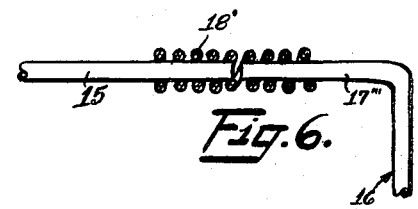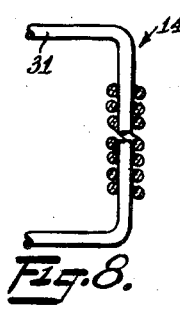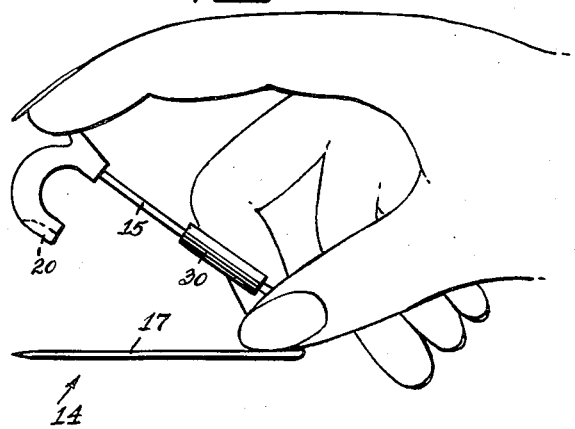

2,941,269

SAFETY PINS

Roger J. Keller, 64—11 99th St., Forest Hills, N.Y.

Filed Jan. 26, 1956, Ser. No. 561,636

7 Claims. (Cl. 24—161)

The present invention relates to safety pins.

The principal object of this invention is to provide a safety pin of novel and improved construction so that when let free, it will close automatically and cover the point, thus preventing tissue puncturing damage inherent in a child's swallowing of the standard safety pin with a normal position of open.

Another object hereof is to provide a novel and improved safety pin of the character mentioned, which requires the use of only one hand for all manipulations thereof and therewith; all manipulations being easily accomplished.

A further object hereof is to provide a novel and improved safety pin of the type stated whose dimensions and general shape are very near that of ordinary safety pins.

Another object is to provide a novel and improved safety pin structure of the class set forth, which is conveniently held in hand and affords easy and effective application of forces required to open it and hold it open and to lace the pointed pin component thereof through fabric material.

A further object of this invention is to afford a novel and improved construction in a safety pin of the kind described, which is made principally of wire, most of which need not be resilient, hence affording a safety pin which is not bent out of shape, not able to be sprung open after being locked due to bunching up of fabric material inclosed within, and possessing great penetrating stability without wobbling when the point is pushed through fabric material.

Another object hereof is to provide a novel and improved safety pin of the character described, having a new construction and mode of operation.

Still a further object is to provide a novel and improved safety pin of the type set forth which is easy and reasonably cheap to manufacture and efficient in carrying out the purposes for which it is designed.

Other objects and advantages will become apparent as this disclosure proceeds.

In the accompanying drawing forming part of this specification, similar characters of reference indicate corresponding parts in all the views.

Fig. 1 shows a safety pin embodying the teachings of this invention. It is shown in hand held open condition.

Fig. 2 shows said safety pin in closed condition.

Fig. 3 is a section taken at lines 3—3 in Fig. 2.

Fig. 4 is a section taken at lines 4—4 in Fig. 2.

Fig. 5 is an enlarged fragmentary view, partly in section, of that portion of the said safety pin which includes the spring means.

Fig. 6 is a view like Fig. 5, but of a slightly modified construction.

Fig. 7 is a longitudinal view of the spring element included in the embodiment of Fig. 6.

Fig. 8 is a view like Fig. 5, but of another modified construction.

Figs. 9 and 10 are views like Fig. 1, but show successive steps of another way for manipulating the safety pin to lace it through fabric.

Essentially, the safety pin taught herein, comprises two joined wire legs which are coplanar and extend in spaced relation, each of the two legs being a separate component thereof and are held together at a junction by a spring. The free end of one of the legs is pointed and from the corresponding end of the other leg there extends a guard element towards said pointed leg. This guard element has a channel into which the pointed end mentioned sets when the legs are in the relationship assumed when the safety pin is in the normal closed position. A spring element is interposed in the structure at said spring element urging the two legs together at junction of the two leg components, either in the preferred position at some point on the guard carrying leg or elsewhere, which urges the two legs together at the distal end, so that when one leg is pulled back to open this safety pin and then released for closure, the pointed end will enter and set into said channel in said guard element. The pointed end will remain in said channel as long as no reverse stress is placed upon the spring element, thereby providing the normal or closed position of this safety pin. The spring used is made to act in the manner of a blade spring. In fact this joining component may be a blade spring, or better yet from the standpoint of economy and efficiency in manufacturing of this safety pin, a helical coil spring is utilized in such a manner that it acts as a blade spring and also as a coupling. When the spring is a coil it is normally round so that its end openings receive into it as a coupling the ends of the wire. While it is preferable that the wire and coil spring be round, it may also be in a square shape for more secure coupling. The spring wire being initially separate, its strength in the flexibility sense can be properly chosen. The wire stock of which the legs are made can be rigid because it is not called upon to furnish the resiliency of the spring means. This is very preferable though not mandatory.

Furthermore, either the pin parts or the spring are so shaped that said pin will be in a slightly stressed condition when the pin is in closed position. This is also preferable through not mandatory. However upon movement of one leg away from the other, the spring element becomes further stressed, so that upon letting the device free, the safety pin will automatically close and remain closed, due to the spring element's returning the legs to their original free position as said spring snaps back to relieve the stress upon itself.

Of major importance are the manners in which this pin is opened. One way is to have a finger piece on the guard carrying leg, and it is advisable to have such as part of the guard itself so that it is at a distance from the spring coupling to offer maximum leverage. The pin is firmly pinched and held at the end opposite from the guard, said gripping being used to make steady the pointed pin leg, then with a free finger on the finger piece, the guard carrying leg is swung away from the pointed leg, thus opening the safety pin. When the safety pin is let go, it will close itself automatically. Another way is to pinch the bight of the safety pin between the thumb and index finger. The safety pin is held tilted and the guard is pressed against the fabric. The pin thus opens and is stuck through the fabric layers. Then by thrusting the hand forward as herein illustrated, the pin is laced through. By this method of manipulation, the opening and the initial penetration is accomplished by the same operation. Other incidents of this manner of lacing the pin will be explained.

Both legs form a U-shape. In order to provide a substantial part or surface to accomplish a good hand grip, the legs are preferably made so that the pointed leg is a J-shape while the guard-carrying leg may be straight. The shape of the two legs depends on the location of the coupling spring; the beforementioned preference of the shape of the legs is not meant to be restrictive for the locating of the coupling spring, or for the shape of either of the two leg components. No call being made on the legs for resiliency, they may be made of very stiff wire stock to provide a substantially rigid frame, possible even to the point of complete rigidity. Hence, the safety pin will not bend out of shape, by the bunching up of fabric material, as happens in the conventional safety pin. The rigid frame will also provide a pin point leg with greater penetrating ability. By having greater stability in its length, wobbling or bending of the pin point leg will be eliminated as the point slides through fabric material. A stiff wire frame is preferred but not mandatory for this safety pin.

In the drawings, are shown preferred forms this invention may assume. Referring to the embodiment shown in Figs. 2 and 3, the numeral 15 designates a straight stiff wire leg positioned to form a U-shape with the J-shaped stiff wire member denoted generally by the numeral 16. The free end 17' of leg 17, is pointed. The adjacent ends of parts 15 and 16 are coupled by a helical coil spring 18; said wire ends tightly fitting within the ends of said coil spring respectively. A guard element 19, extends from the leg 15 towards the leg 17, and presents a channel 20 into which the pointed end 17' sets. The spring 18, when its longitudinal line is bent, becomes stressed. Such stress of course occurs when the legs 15 and 17 are swung apart for the pin 14 to be open. The leg 15 may carry a finger piece at a distance from the spring 18, and in some instances such finger piece 21 may be on the guard 19. It is advisable that the spring 18 shall have some initial stress when the pointed end 17' lies within the channel 20. Once the pin 14 is opened as in Fig. 1 and then released by the hand 32, it is evident that the pin 14 will close automatically to the condition shown in Fig. 2. It is evident that the split in the U-shape member forming the body of the pin 14, may be anywhere and another example is indicated in Fig. 8 where at least one of the components of said U-shaped member is L-shape as denoted by the numeral 31.

The initial stress in the coil spring as here required may be accomplished by using a coil spring 18 which when separate from the assembly, is of straight longitudinal axis, in which case the shorter leg 17'' of the J-piece 16 is bent to convergent relation with leg 17 in the direction towards the point 17' as shown in Figs. 2 and 5. Or if desired, this can be accomplished by having legs 17 and 17''' parallel and using a coil spring 18' which is initially bent as in Fig. 7. In Figs. 2 and 5, the numeral 29 indicates a collar which may be included on the bight of the J-piece 16, to act as a stop to avoid "riding up" of the fabric laced through by the pin leg 17.

It is to be noted that only a few turns of the coil spring 18 are utilized for the bending, because the wire ends therein anchored are very near one another. The wire stock of the legs 15 and 17 may be square to better acquire alignment.

Should it be desired to have a locking means for the pointed pin end 17', the guard may be of the construction indicated by the numeral 24 where there is construction which permits it to slide down the upper end portion of the leg 15, with a suitable socket to receive the pin point, which is well known in this art and therefore is not shown because no claim is made therefor.

One manner of opening the pin is shown in Fig. 1 and has been explained. It may be noted however that it is convenient to pinch the pin by holding the bight portion of the J-piece 16 between the thumb and third finger, while the index finger is used to pull on the finger piece 21. After fabric material is laced on leg 17 and the hand let go, spring action of 18, will bring leg 15 towards leg 17 and the pointed end 17' will set into the channel 20 of the guard 19. Another practical way of manipulating the pin, is shown in the successive steps illustrated in Figs. 9 and 10. Here, the bight portion of the J-piece 16 is pinched between the thumb and index finger and the safety pin is first held tilted as shown in Fig. 9. The guard 19 is pressed against the fabric 33, whereby the pin opens and is stuck into the fabric. Then by continuing to thrust the hand forward, you assume the position shown in Fig. 10 and the pin is laced through the fabric layers. By this method of manipulation, the opening and the initial penetration of the pin is accomplished in the same operation and it is to be noted that thereafter, on easing the pinch-hold of the hand, the pin point due to action of the spring 18, will be brought in contact with and glide along the underside of the lowermost fabric ply while there exposed. This reduces the possibility of injury or scratching by the point, to a baby being diapered or to a finger held on the inside of the diaper. It is important to note, that at the same time, as the hand moves to lace, the guard 19 will glide along the upper surface of the fabric and the pin will automatically be open only in accordance with the fabric thickness being laced through. The opening of the pin and its lacing through is accomplished with a minimum of effort because of the easy working of the spring. Since in this manner of manipulation, the finger piece 21 has no use, it may be dispensed with.

To acquire good working, it is advisable that the wire components of the pin 14 substantially fill the interior of the coil spring 18. This also makes for secure assembly. It is to be noted that only a few intermediate turns of the coil spring are bent as the pin 14 is opened when the distal ends of members or legs 15 and 17 are moved apart. To avoid the fingers from being pinched between the coil turns, the spring 18 may be covered by a plastic or rubber sleeve 30.

It is also to be noted that the components 15 and 16 of the pin 14 may even be of really rigid stock of the same kind that thin nails are made of. In the choice of the word stiff as referred to in this specification and the appended claims, it shall mean a stiffness with little resiliency if any at all, and shall even include complete rigidness.

Of importance is that any of these safety pins 14 lying around loose will always be in closed condition as in Fig. 2. When a person is groping in a drawer and feeling around for things, he would never be stuck by the pin point 17'. If a pin 14 is swallowed, it would be in a closed and not an open condition, preventing damage from the pin point 17'.

This invention is capable of numerous forms and various applications without departing from the essential features herein disclosed. It is therefore intended and desired that the embodiments set forth herein shall be illustrative and not restrictive and that the patent shall cover all patentable novelty set forth herein; reference being had to the following claims rather than to the specific description herein to indicate the scope of this invention.

I claim:

1. A safety pin, comprising a plurality of relatively stiff wire elements shaped to form complementary portions of a substantially U-shaped body when portions thereof are juxtaposed in end-to-end relation to one another, said body including a pair of legs and a bight connecting said legs; the end of one of said legs being pointed and the end of the other of said legs carrying a guard having point receiving means, and transversely and relatively easily flexible spring means connecting the juxtaposed portions of said elements in end-to-end relation and biasing said elements, to normally dispose said pointed end in said point receiving means.

2. A safety pin, comprising a pair of relatively stiff wire elements shaped to form complementary portions of a substantially U-shaped body when portions thereof are juxtaposed in end-to-end relation to one another, said body including a pair of legs and a bight connecting said legs; the end of one of said legs being pointed and the end of the other of said legs carrying a guard having point-receiving means, and a transversely and easily flexible spring connecting the juxtaposed portions of said elements in substantially aligned end-to-end relation and biasing said elements, to normally dispose said pointed leg end in said end receiving means.

3. The safety pin of claim 2, wherein the element having the pointed end comprises one complete leg and at least a portion of the bight of said body.

4. The safety pin of claim 2, wherein the element having the pointed end comprises one complete leg, the bight, and a portion of the other leg of said body.

5. The safety pin of claim 2, wherein said spring comprises a wire coil spring.

6. The safety pin of claim 2, wherein said spring comprises a wire coil spring, said juxtaposed portions of said elements being received and held in the opposed ends of said coil spring.

7. A safety pin, comprising a plurality of stiff wire elements shaped to form, when portions thereof are juxtaposed in end-to-end relation to one another, a body, including a pair of spaced legs and a bight connecting said legs at one end thereof, the other end of one of said legs being pointed and the other end of the other of said legs carrying a guard having point-receiving means, an element comprising the first of said legs extending the full length of said leg and at least a portion of said bight, and easily flexible spring pivot means connecting said portions in end-to-end relation and biasing said pointed end of said first leg toward said point-receiving means on said other leg.

References Cited in the file of this patent

UNITED STATES PATENTS

| | | |
|---|---|---|
| 118,533 | Hockensmith | Aug. 29, 1871 |
| 531,173 | Ford | Dec. 18, 1894 |
| 666,860 | Buzzacott | Jan. 29, 1901 |
| 893,555 | Sullivan | July 14, 1908 |
| 958,311 | Reed | May 17, 1910 |
| 1,019,578 | Wright | May 5, 1912 |
| 1,374,006 | Gedney | Apr. 5, 1921 |
| 1,451,478 | Smith | Apr. 10, 1923 |
| 1,540,531 | Boswell | June 2, 1925 |
| 1,837,039 | Gober | Dec. 15, 1931 |
| 2,132,038 | Mizer | Oct. 4, 1938 |
| 2,692,416 | Jordan et al. | Oct. 26, 1954 |

FOREIGN PATENTS

| | | |
|---|---|---|
| 95,768 | Germany | of 1898 |
| 146,369 | Great Britain | of 1921 |
| 398,547 | France | Mar. 26, 1909 |
| 429,577 | Germany | May 31, 1926 |